Sept. 3, 1929.  H. W. ASIRE  1,727,045
COLD DISTRIBUTION MANIFOLD
Original Filed March 21, 1925   3 Sheets-Sheet 2
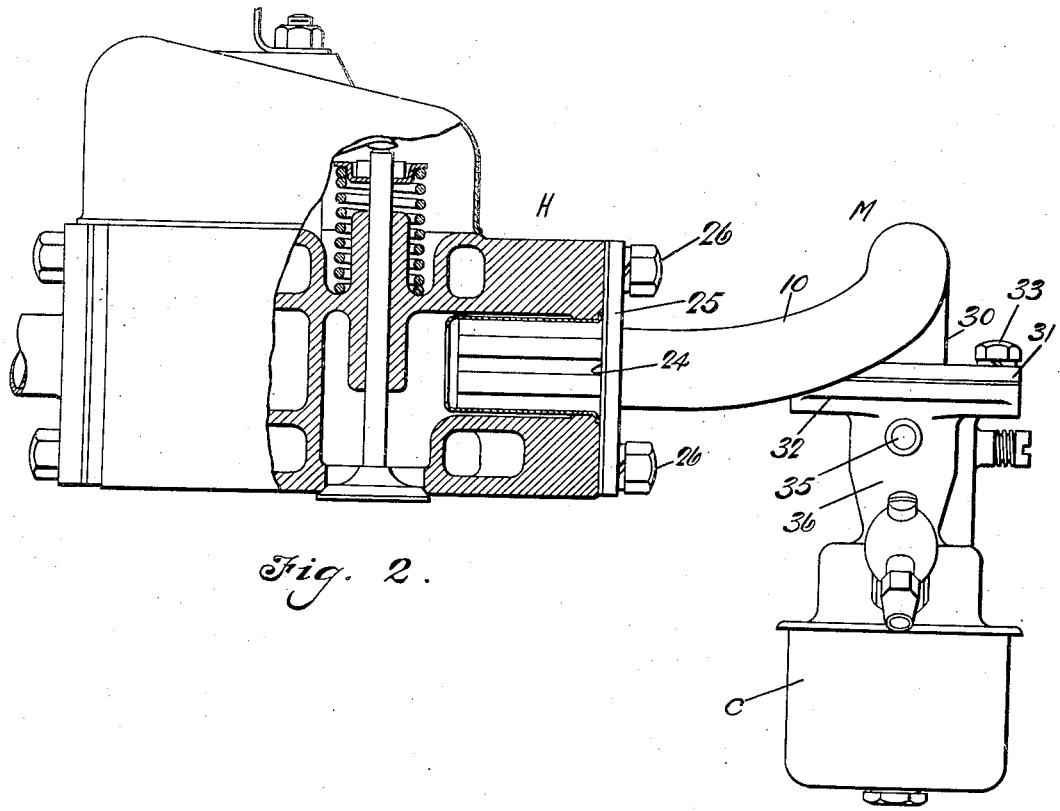
Fig. 2.
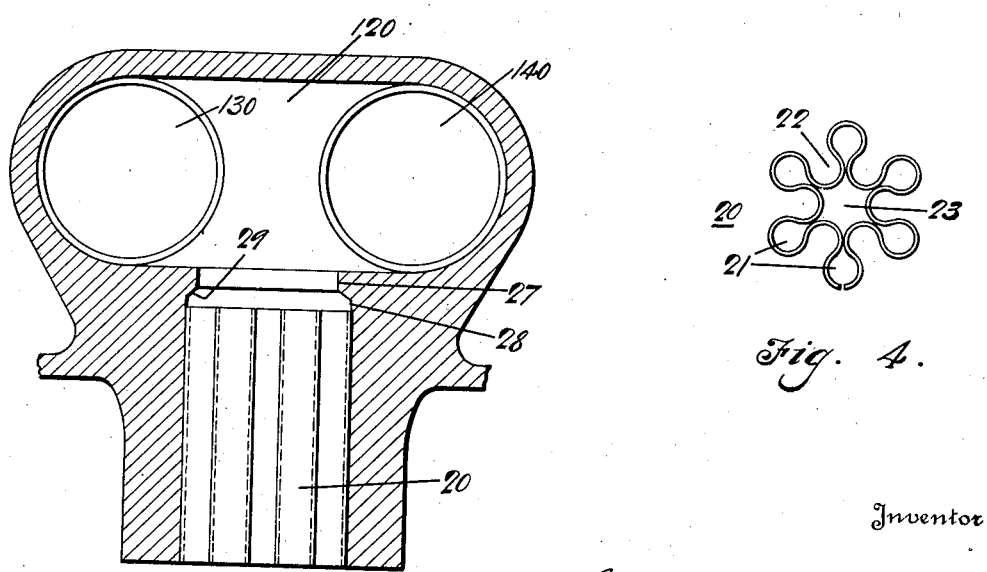
Fig. 3.
Fig. 4.
Inventor
Horace W. Asire,
By Spencer, Sewall & Hardman,
his   Attorneys

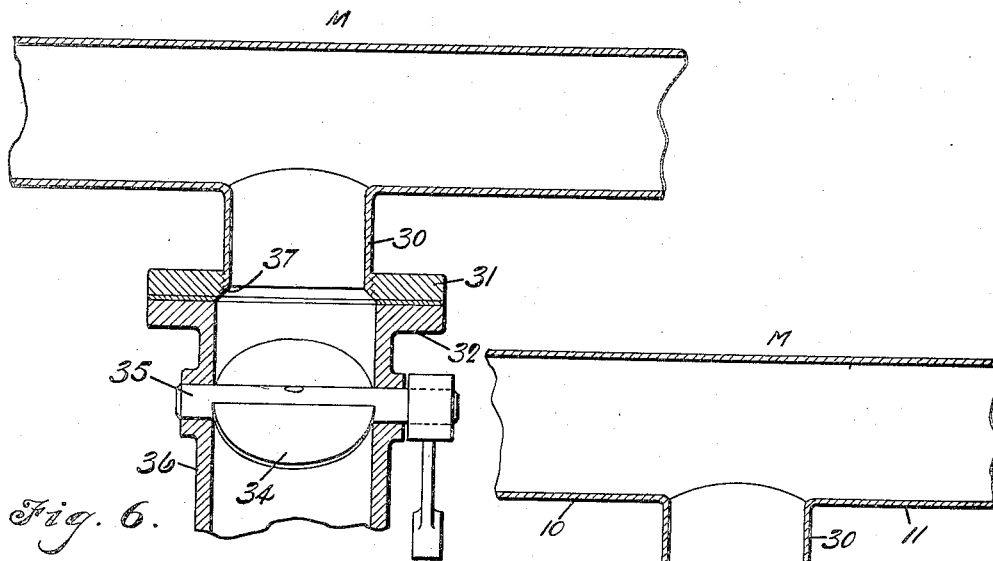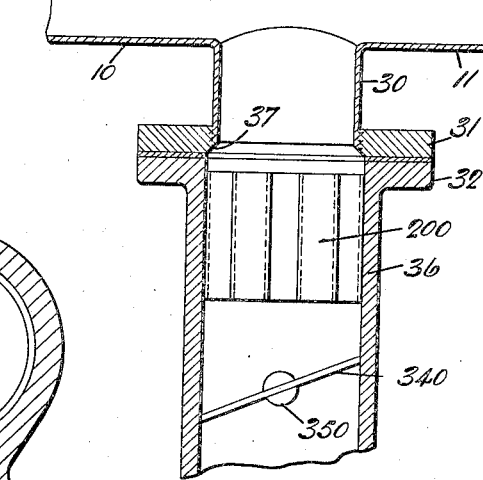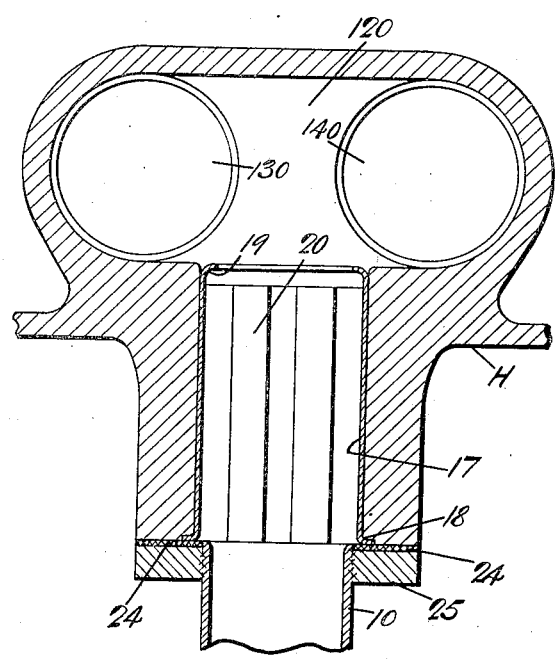

Patented Sept. 3, 1929.

1,727,045

UNITED STATES PATENT OFFICE.

HORACE W. ASIRE, OF DAYTON, OHIO, ASSIGNOR TO GENERAL MOTORS RESEARCH CORPORATION, OF DAYTON, OHIO, A CORPORATION OF DELAWARE.

COLD-DISTRIBUTION MANIFOLD.

Application filed March 21, 1925, Serial No. 17,399. Renewed October 29, 1928.

This invention relates to means for charging the combustion chambers of a multicylinder internal-combustion engine. It involves specifically, means adapted to evenly distribute a charge of liquid fuel and air among the several cylinders. The invention consists in an engine having multiple cylinders provided with intake ports communicating with a valve or mixture-receiving chamber adjacent and common to the ports, and a conduit terminating within the chamber, said conduit having means adapted to eliminate eddying of the aeriform currents delivered to the chamber and to deliver the liquid portions of the charge symmetrically with respect to the several ports.

It further involves a manifold having a riser for conducting fuel and air to the manifold in combination with a throttle valve in the riser with associated means for directing liquid fuel to the junction of the manifold and riser so that substantially equal quantities of liquid fuel are delivered to the several branches of the manifold.

In the accompanying drawings in which like reference characters indicate like parts throughout the several views:

Fig. 2 is an elevation partly in section on the broken line 2—2 of Fig. 1;

Fig. 3 is a horizontal section of a fragment showing a slight modification;

Fig. 4 is a detail of a sheet-metal air straightener utilized in this invention, looking at one end;

Fig. 5 is a horizontal section of a fragment showing another slight modification;

Fig. 6 is a fragmentary view, partly in section, of a manifold and riser, looking at the intake side of the engine; and Fig. 7 is a view similar to Fig. 6, showing a modified position of the throttle valve and a modified form of riser.

Figure 1:
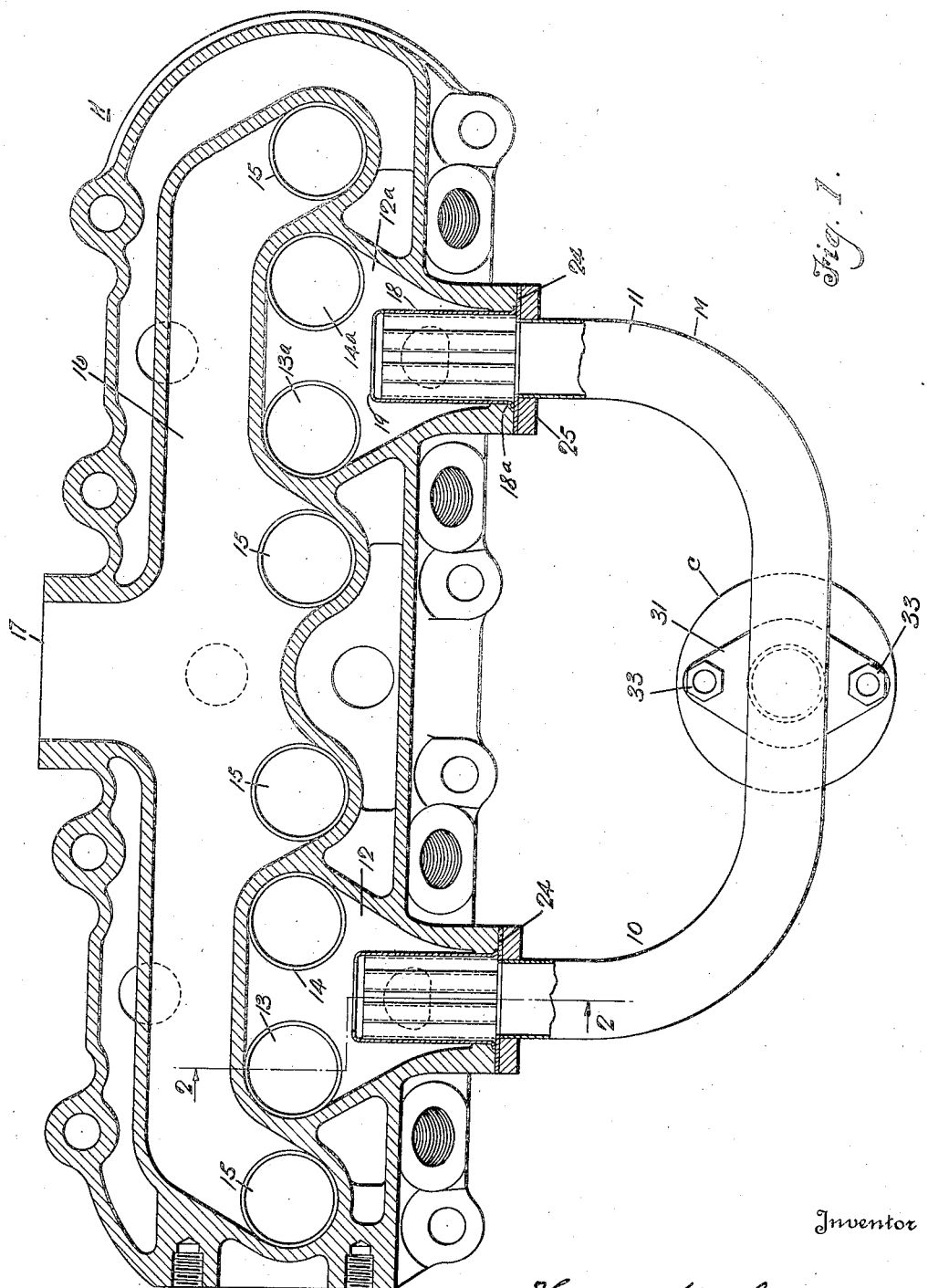
Fig. 1 is a horizontal section through an engine head of the overhead-valve type, the intake manifold being shown in plan.

The embodiments illustrated in the drawings are applied to four-cylinder, overhead-valve engines, but it will be apparent that this type of engine is shown merely for purposes of illustration and that the invention may be applied to multicylinder engines of other types and with a different number of cylinders.

Referring to Figs. 1 and 2, H represents a cylinder head; M a fuel mixture conductor or intake manifold; and C any standard carburetor.

The manifold M is shown as having two branches 10 and 11, each branch communicating with a fuel-mixture receiving chamber 12 or 12ª, formed, in the embodiment shown, within the cylinder head H. Chamber 12 communicates with two adjacent cylinders by means of valve-controlled intake parts 13 and 14, respectively, and chamber 12ª, by like ports 13ª and 14ª, communicates with two other cylinders. As indicated in Fig. 1, 13 is the intake port of #1 cylinder; 14 the intake port of #2 cylinder; 13ª the intake port of #3 cylinder; and 14ª the intake port of #4 cylinder. Numerals 15 indicate the several exhaust ports of the cylinders which communicate with the exhaust manifold 16, discharging at 17 into an exhaust pipe (not shown). In this instance, the exhaust manifold is formed within the head. The mixture-receiving chamber 12, communicating with two adjacent cylinders through the intake ports 13 and 14, is a well-known structure in internal-combustion engines frequently referred to as "siamesed intakes."

In this arrangement of cylinders and intake ports, each branch of the intake manifold communicates with a chamber 12 or 12ª, which may be called a valve pocket, and the intake stroke of the pistons of the respective cylinders, the intake ports of which communicate with the same chamber, draws the fuel from said chamber into one cylinder or the other, according to which port is open during the intake stroke. In the usual manifold connection of this type, the fuel mixture delivered to the chamber is in a somewhat turbulent condition and liquid particles drawn into the chamber are likely to be unequally distributed around it so that it may occur, unless the engine is well heated up, that one cylinder will receive an over-large charge of fuel drawn from the chamber while the other may be starved, with the result of uneven firing, deficient power, crankcase dilution and waste of fuel.

In the improvement which forms the subject of this application, the end of the fuel conduit, in this case each end or continuation of the manifold branches, which delivers fuel mixture to a receiving chamber common to a plurality of cylinder intake ports, is subdivided into a plurality of straight passages which prevent eddying and straighten out the aeriform currents flowing to the chamber 12 or 12ª, so that the mixture is discharged adjacent the intake ports, and at a location substantially equidistant from each, in such a state that equal volumes of fuel and air will be distributed to each adjacent cylinder. As shown in Figs. 1 and 2, the discharge ends of the intake conduit are formed by a tubular member 18 that is inserted into the exterior opening of the chamber 12 or 12ª in the cylinder block. Said tubular member 18 may be of thin wrought steel or other suitable metal having an external flange 18ª at one end, adapted to fit in a shallow countersunk seat in the cylinder block surrounding the exterior opening. Its inner end is provided with an internal annular shoulder 19. Within the tubular section 18 are a plurality of passages, as shown, formed preferably by a single sheet of thin metal folded or looped as illustrated in Fig. 4, inserted within the tube and preferably held frictionally therein. The looped sheet-metal insert provides a plurality of passages 21, 22 and 23. It is obvious that the plurality of passages may be produced in the tube 18 by other forms of partitions; the form shown, however, has been found most convenient to manufacture and quite suitable for the purpose in view.

The tube 18 may be secured in position protruding into the chamber 12 as shown in Fig. 1, or fitting a bore communicating with the chamber 120, as in Fig. 5, by means of its said external flange 18ª clamped in place by the gasket 24 sealed between a preferably machined face of the head adjacent the external opening of the chamber and a locking flange 25 on the manifold bolted to the head, as by bolts 26.

In the form of embodiment shown in Fig. 3, the tubular section 18 is not used, the continuation of the intake conduit in this instance being formed by boring and counterboring the head so as to form the discharge opening 27 into the chamber 120 with which intake ports 130 and 140 of adjacent cylinders communicate. The counterbored portion 28 constitute the main conduit into which the sheet-metal straightener 20, for subdividing the passageway into a plurality of passages, is inserted in the same manner as it is in the tubular section 18. The annular shoulder 29 formed at the junction of the bore 27 and counterbore 28, has the same relative position and the same function as the annular shoulder 19 of the tubular section 18.

The object of this invention, as heretofore indicated, is to improve distribution of fuel mixtures among the several cylinders of an internal-combustion engine so that, as nearly as possible, equal quantities of liquid fuel may be delivered to the several cylinders even though the fuel may be carried along in the air currents in small drops of liquid. When the incoming mixture of air and liquid fuel is in the form of a gas or light fog, as may be the condition when considerable heat is applied to the intake manifold, distribution may be fairly even whatever form of manifold or other fuel conduit is used. Difficulties of uneven distribution occur in starting a cold engine, or operating an engine in cold weather, when liquid fuel is deposited here or there on the walls of intake conduits in drops and puddles, so that at different times different accumulations of fuel proceed to different cylinders. It is well understood that greater volumetric efficiency is obtainable in the operation of internal-combustion engines when the fuel is not highly heated outside of the combustion chamber. It is, therefore, highly desirable to operate engines on fuel mixtures which have not been preheated to any great degree. In this invention the operation of the straight plural passages which deliver directly to the siamesed intake ports, remove eddies from the mixture current and segregate portions of the current, thus preventing unequal distribution of liquid upon one side or another of the intake conduit, and this enables the mixture to be distributed symmetrically with respect to the two intake ports. Furthermore, the internal annular shoulder 19 or 29, serves as an equalizing ring operating to dam liquid, which may collect upon one side or the other of the intake conduit, and cause it to flow around the shoulder or ring and distribute itself equally circumferentially of the conduit until such time as there is sufficient accumulation to permit it to overflow the edge of said shoulder or ring and proceed to the central portion of the chamber in position to be delivered in equal quantities to either intake port, as the demands of the engine require.

Thus far there have been described means for obtaining equal distribution of cold mixtures of liquid fuel and air to a pair of cylinders having siamesed intake ports. The means described constitute satisfactory cold mixture distributors for two-cylinder engines of this type. For cold distribution to engines of more than two cylinders, say four or six, where intake manifolds having two or more branches are used, it is necessary in order to secure best results, to utilize means for equally distributing to the several branches, liquid fuel mixtures delivered from the carburetor to said manifold branches by way of a common riser conduit leading from the carburetor to the junction of said branches.

In order that the mixture may be equally distributed to the two branches 10 and 11 of manifold M, the construction illustrated in Figs. 2 and 6 may be used, or as an alternative, that illustrated in Fig. 7.

In both of said forms, a short section 30 depends from the mid-portion of manifold M, forming a T with the branches 10 and 11. A flange 31 may be formed on or fixed to the lower end of section 30, to which the carburetor C is bolted, the upper end of said carburetor having a flange 32 through which and said flange 31 are passed securing bolts 33. In both constructions an equalizing ring 37 is disposed in the passage between the carburetor and the branches 10 and 11 above the throttle which, in the forms illustrated, may be a butterfly valve.

In the construction shown in Figs. 2 and 6, the means for effecting equal distribution comprises a riser conduit having an equalizer ring 37 above a throttle 34, operating in such manner that the fluid passages provided and controlled by the movements of the throttle will be so disposed with respect to the two branches 10 and 11, that a plane perpendicular to said manifold and intersecting it in the axis of the tubular section 30 will divide the passage or passages between the throttle valve and the wall of the riser portion 36 of the carburetor symmetrically. By this construction the stream of fuel mixture will be caused to enter the manifold equidistant from the intake ends of both branches, instead of proceeding up one side or the other of the tubular section 30 nearer to the entrance of one branch than to the other. The desired result may be achieved by pivoting the throttle valve 34 on an axis 35 which is parallel to the engine block or to the general direction of the two branches 10 and 11 of the manifold at the T.

With the embodiment of Figs. 2 and 6, any liquid deposited on the walls of the upright above the ring tends to enter the branches 10 and 11 in equally-divided volumes because it enters the branched manifold no nearer to the entrance of one branch than to that of the other.

The equalizing ring 37 may be formed at the junction of the tubular sections 30 and 36 of the manifold and carburetor by making the riser portion 36 of the carburetor of slightly larger internal diameter than that of tubular section 30 and preferably beveling the shoulder so formed. The shoulder formed at the junction of sections 30 and 36, when the carburetor is bolted to the section 30 so that the bores of section 30 and riser section 36 are concentrically disposed, constitutes an annular equalizing ring functioning to check the flow of liquid upward. Thus liquid creeping upward on one side or another of the riser passage in section 36 will accumulate below the ring, flow circumferentially around the passage and finally overflow the edge of the ring symmetrically and proceed to the junction at the T so distributed that substantially equal quantities will flow to the several branches of the manifold in response to the intake strokes of the pistons.

In case the throttle is so constructed as to direct the stream of mixture to one side or the other of the upright mixture passage, nearer to one branch of the manifold than to the other, as when a throttle 340, as illustrated in Fig. 7, is pivoted on an axis 350 at right angles to the side of the engine block, it is desirable to insert a straightening device 200 in the mixture passage between the equalizing ring 37 and the throttle, as shown in said Fig. 7. The straightening device 200 may be formed in the same way as device 20 shown in Fig. 4, so as to subdivide the upright fuel passage into a plurality of straight passages adapted to prevent any great volume of liquid fuel from depositing on the sides of the riser section 36, to straighten out eddy currents and to conduct the most of the fuel into the body of the aeriform current flowing to the manifold branches. Such liquid fuel as does deposit on the wall of the section 36 will be dammed by the equalizer ring 37, distribute itself circumferentially and finally overflow the edge of the ring and proceed symmetrically upward to the junction of the T.

While the forms of embodiment of the invention as herein described, constitute preferred forms, it is to be understood that other forms might be adopted, all coming within the scope of the claims which follow.

What is claimed is as follows:

1. In a multicylinder internal-combustion engine, cylinders having intake ports communicating with a common chamber, a conduit arranged to discharge into said chamber, said conduit including a tubular portion projecting into said chamber, the inner end of said tubular portion having an annular internal shoulder constituting an equalizing ring, and means forming a plurality of straight passages in said tubular portion.

2. A multicylinder internal-combustion engine, a cylinder block comprising cylinders, a valve pocket and intake ports communicating with said pocket, a tube projecting into said valve pocket, the inner end of said tube having an internal annular shoulder constituting an equalizer ring, means forming a plurality of straight passages in said tube, and a fuel mixture conductor having a discharge end connected with said block in registration with said tube; said fuel mixture conductor and tube constituting a conduit for fluid passing to the cylinders for combustion purposes.

3. Means for equalizing the distribution of fuel to a plurality of cylinders having intake ports communicating with a common chamber, said means comprising a tube having a plurality of passages, said tube being adapted to be inserted and project into said chamber, and to register with an external fuel conductor.

4. Means for equalizing the distribution of fuel to a plurality of cylinders having intake ports communicating with a common chamber, said means comprising a tube adapted to be inserted and project into said chamber, said tube having at its inner end an internal annular shoulder constituting an equalizing ring, and a sheet-metal member forming a plurality of straight passages inserted in said tube.

5. In a multicylinder internal combustion engine, cylinders having intake ports communicating with a common chamber, a conduit including a throttle, said conduit being directly connected with said chamber and arranged to discharge into said chamber, an equalizing ring in said conduit and means forming a plurality of straight passages in said conduit, said means lying wholly anterior to the equalizing ring.

6. In a multicylinder internal combustion engine having a siamesed intake valve pocket, an intake conduit discharging into said valve pocket midway between the two inlet valves, and partitioning means dividing the delivery end of said conduit into a plurality of straight parallel passages whereby eddies in the fuel mixture are straightened out prior to delivery into said valve pocket.

7. In a multicylinder internal combustion engine having a plurality of siamesed intake valve pockets, a branched intake conduit having a branch discharging a fuel mixture into each of said pockets midway between the two inlet valves therein, and partitioning means dividing the delivery end of each branch into a plurality of parallel straight passages.

8. In a multicylinder internal combustion engine having a siamesed intake valve pocket, an intake conduit discharging into said valve pocket midway between the two inlet valves, the delivery end of said conduit being abruptly reduced in diameter, and flow straightening means within said conduit closely adjacent but spaced from the abrupt reduction in diameter thereof.

9. In a multicylinder internal combustion engine having a siamesed intake valve pocket, an intake conduit discharging into said valve pocket midway between the two inlet valves, said conduit including a separately formed extension projecting within the valve pocket to a point closely adjacent the inlet valves, and flow straightening means within said extension whereby eddies in the fuel mixture are straightened out closely adjacent the inlet valves.

10. In a multicylinder internal combustion engine having siamesed intake valve pockets, an intake manifold having a plurality of discharge conduits each of which discharges into one of said valve pockets, partitioning means dividing the delivery end of each of said conduits into a plurality of straight parallel passages whereby eddies in the fuel mixture are straightened out prior to delivery into the valve pocket, a conduit connecting the manifold to a source of fuel mixture supply and partitioning means dividing said conduit into a plurality of straight passages to secure equal distribution of the fuel mixture to the different branches of the manifold.

11. In a multicylinder internal combustion engine having siamesed intake valve pockets, an intake manifold having a plurality of discharge conduits each of which discharges into one of said valve pockets, partitioning means dividing the delivery end of each of said conduits into a plurality of straight parallel passages whereby eddies in the fuel mixture are straightened out prior to delivery into the valve pocket, a conduit connecting the manifold to a source of fuel mixture supply, an equalizer ring in said conduit, and partitioning means dividing said conduit into a plurality of straight passages to secure equal distribution of the fuel mixture to the different branches of the manifold.

In testimony whereof I hereto affix my signature.

HORACE W. ASIRE.